Figure 3:
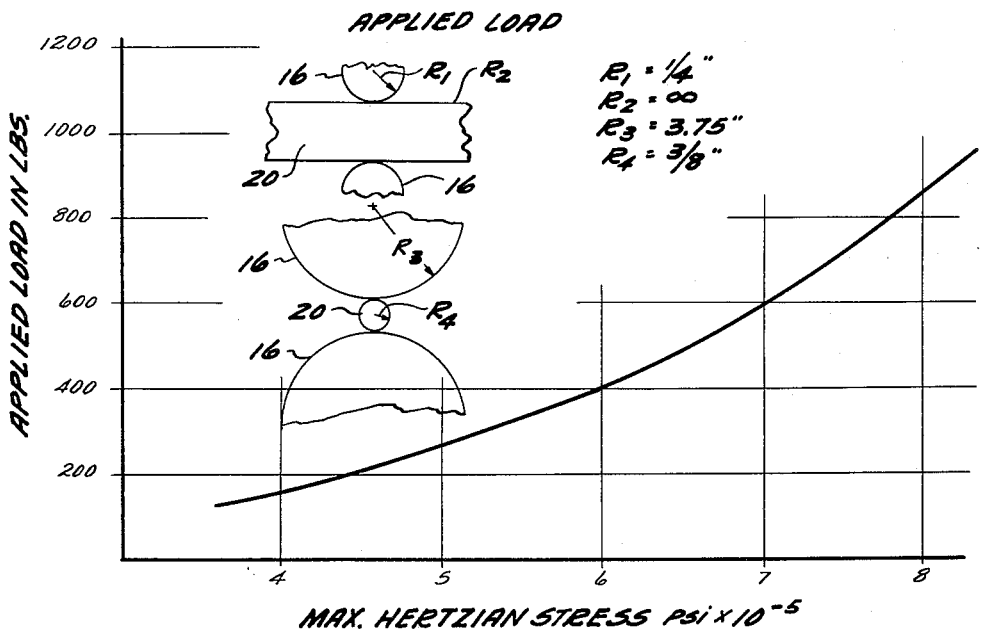

Sept. 11, 1962 R. A. BAUGHMAN 3,053,073
BEARING MATERIALS TESTER
Filed Nov. 27, 1959 2 Sheets-Sheet 1
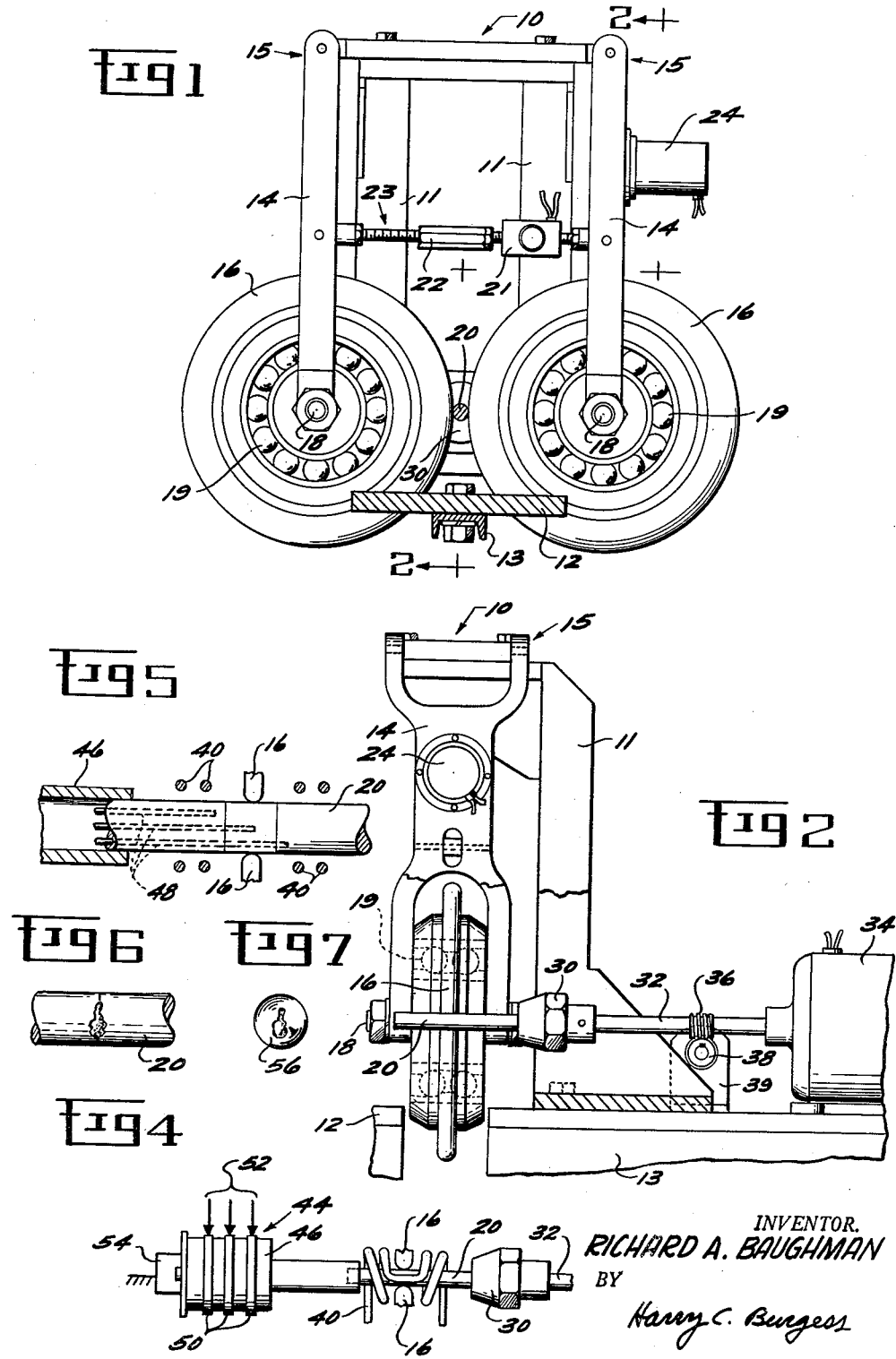
INVENTOR.
RICHARD A. BAUGHMAN
BY
Harry C. Burgess
ATTORNEY INVENTOR.
RICHARD A. BAUGHMAN
BY Harry C. Burgess
ATTORNEY United States Patent Office
3,053,073
Patented Sept. 11, 1962

3,053,073
BEARING MATERIALS TESTER
Richard A. Baughman, Cincinnati, Ohio, assignor to General Electric Company, a corporation of New York
Filed Nov. 27, 1959, Ser. No. 855,914
3 Claims. (Cl. 73—7)

This invention relates to apparatus for obtaining accurate bearing material design data and, more particularly, to apparatus which will enable bearing material specimen fatigue data to be accurately correlated with actual bearing fatigue data.

With the advent of high-Mach aircraft and the stresses and strains caused by the high speeds and high temperatures accompanying operation of such aircraft, it has become necessary to develop very accurate design data on metallic materials, in general, and on bearing materials, in particular. Obviously, one of the reasons for requiring such accuracy is the demand for extreme reliability of components for these aircraft, and also for missiles of various types. In addition, while vehicles have been designed which will operate at very high temperatures, e.g., in the range from 700° F. to 1500° F. or above, solid and liquid lubricant development has not kept pace with the need for materials which will function at these higher temperatures. Therefore, new bearing materials will have to be evaluated and/or developed that will function under dry or, at best, boundary lubrication conditions.

Obtaining accurate bearing material data, especially fatigue data, however, is one of the most difficult tests to perform in the laboratory. In fact, conventional fatigue data thus obtained has not been useful, the only known successful method being that of "after the fact" actual bearing endurance testing. The difficulty stems from two quite different sources, namely: (1) the metallurgical nature of the materials involved, e.g., extremely high hardness, high strength, general notch sensitivity and low impact chaarcteristics; and (2) the relative difficulty in correlating laboratory test data with actual bearing applications. For instance, it is known that certain hard, wear-resistant materials may be able to serve as bearings in restricted applications of short life or low speed, low load conditions in the temperature range mentioned above, but prior means of evaluating these potential materials under simulated rolling contact conditions have proved too expensive and cumbersome to permit much work. Although a number of attempts at obtaining accurate fatigue data have been recorded which have uncovered many significant factors influencing fatigue life in bearing steel, none of these previously known methods have been able to demonstrate reproducible correlation of the test data with actual bearing fatigue data primarily because the loads applied to the bearing materials were of a tensile-compressive nature, whereas actual bearing loads are continually compressive. These shortcomings and the inability of actual bearing endurance testing to isolate single variables for independent study have resulted in data which is, in fact, almost worthless because of the effect of numerous material, design, or manufacturing variables.

Accordingly, an object of the present invention is to provide an improved apparatus for obtaining more accurate laboratory test data on bearing materials.

A further object of the invention is to provide an improved apparatus for obtaining more accurate bearing material fatigue test data in the laboratory which will be capable of correlation with actual bearing fatigue data.

Another object of the invention is to provide an improved apparatus for obtaining more accurate laboratory bearing fatigue data under dry or boundary lubrication conditions and under high temperature conditions which can be correlated with actual bearing design.

A still further object of the invention is to develop an improved apparatus for obtaining more accurate laboratory bearing material stress data which can be used to test bearing geometry and correlated with actual bearing design data.

Briefly, my invention comprises a machine having a pair of stress-applying hemispherically-ground rollers and means to cause the rollers to impinge on a bearing material specimen, which means also regulates and indicates the impinging load so that compressive stress patterns typical of those encountered in actual bearing operation can be obtained.

Figure 8:
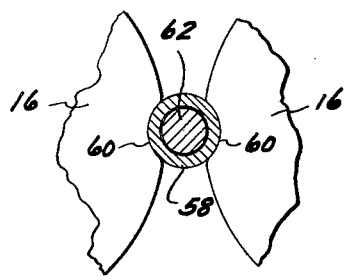
Figure 9:
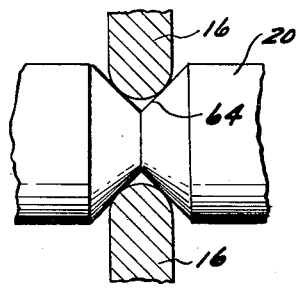

While the specification concludes with claims particularly pointing out and distinctly claiming the subject matter which I regard as my invention, it is believed the invention will become more apparent when read in light of the specification and the accompanying drawings wherein:

FIG. 1 is an end view in elevation of an embodiment of my bearing materials tester, and FIG. 2 is an elevation taken along line 2—2 of FIG. 1 with one of the rollers having been removed, and FIG. 3 is a schematic diagram illustrating an arrangement of a test specimen and calculated rollers, and showing a typical load cell load versus maximum Hertzian stress, and FIG. 4 is a side view in elevation illustrating the provision for an induction coil for high temperature testing, and FIG. 5 is a fragmentary view illustrating means for determining temperature variation in the bearing material specimen under test, and FIGS. 6 and 7 are pictorial views illustrating the correlation between the bearing fatigue failures indicated in the laboratory tests as compared to an actual bearing fatigue failure, and FIG. 8 is a fragmentary end view in elevation, and partly in section, showing my machine modified to perform a sliding wear test of bearing material, and FIG. 9 is a fragmentary side view in elevation and partly in section illustrating my machine set up to test bearing geometry.

Referring now to the drawings, FIG. 1 illustrates one embodiment of my bearing materials tester. Indicated generally at 10 is a frame having upright portions 11—11 and a base portion 12. The base portion of the frame is adapted to be rigidly secured to an elongated bed 13, which is best shown in FIG. 2. The frame, which is preferably fabricated of cold-rolled steel or a similar material, supports a pair of massive steel yokes 14—14. The yokes are secured to the frame by means of a pair of press-fitted hardened pin-joints, indicated generally at 15—15. The pin-joints provide a pendulum-like action to the steel yokes.

The main stress-applying members are in the form of two hemispherically ground special steel rollers 16—16. As shown in FIGS. 1 and 2, the rollers are mounted in diametric opposition to each other on a pair of axles 18—18 rotating within ball-bearings 19—19. By reason of the pendulum like support provided by the yokes, the rollers merely idle, being driven by impingement on a test specimen shown at 20.

My improved testing apparatus incorporates a mechanical device to regulate, and also to indicate, the impingement of the idling rollers 16—16 in the form of a load cell 21 accurately calibrated with a suitable tensile-measuring machine (not shown) to supply specific loads. The tensile-measuring machine is used in conjunction with a strain analyzer (also not shown) to calibrate the load cell prior to use by applying a specific load to the cell. The load cell 21 is preferably of the variable-capacity type to enable test stresses to be changed over a wide load range. A strain analyzer may also be connected during the test to note any load changes, although this is not essential to the test. The load is applied mechanically by means of a fine-threaded turnbuckle 22 mounted on a threaded rod, indicated generally at 23, which also supports the load cell, or by any other suitable mechanical or hydraulic means. The rod shown is in three sections, the two end sections being affixed to the yokes 14—14 and the middle section being disposed between the load cell and the turnbuckle.

Also affixed to one of the yokes 14 is a velocity-vibration indicator 24. While use of a strain analyzer would provide constant knowledge of the load at any moment of the test and a control for test termination of the bearing material, the velocity-vibration unit, by means of an electrical pickup, will sense any vibration induced failure and discontinue rotation of the bearing material specimen at the time the failure occurs.

Although especially useful in the evaluation of unlubricated bearing materials, my improved apparatus, which I have termed an "RC rig," can also be utilized for studying the effects of various lubricants on bearing life. In such cases the rig may incorporate any suitable lubrication container having means providing a gravity-flow, drip, throwaway system for the tests.

FIG. 2 perhaps better illustrates how the specimen 20 is substantially centrally positioned on a line between and connecting the centers of the rollers 16—16 to obtain the desired compressive stress patterns used to compile fatigue data. Indicated at 30 in the drawing is a standard type chuck for gripping the specimen. The chuck is attached to the end of an extended rotor shaft 32 of an A.C. motor 34 rigidly affixed to the bed 13 in any suitable manner. The motor preferably is of the variable speed type, having a maximum speed of at least 16,500 r.p.m. Helical threads 36 on the rotor shaft 32 are adapted to mate with a grooved wheel 38 on a revolution counter 39 to enable the operator to know exactly how many revolutions the specimen has taken before failure occurs and the motor is cut off. The motor leads, of course, should be connected to the velocity-vibration indicator 24 so that the pickup can automatically switch off the motor. The load cell may also be provided with an automatic cut-off which shuts down the test when the load factor is reduced, say, 10% due to wear, i.e., as the specimen wears and begins to plastically deform, the decrease in tension can be monitored at the turnbuckle.

As will be realized from the description of the device shown in FIGS. 1 and 2, stress in the RC rig is obtained by intimate contact between the impinging rollers and the specimen, the impingement of the rollers creating a compressive stress pattern in the specimen. Perhaps the principle of the rig is best explained by relating the concept of specimen stress to bearing stress by considering the tester as being, in actuality, a "two-ball" ball-bearing in which a careful record of stress and number of stress cycles is kept. The bearing race is represented by the test specimen and the rollers 16—16 are the equivalent of the "balls" of the ball-bearing.

FIG. 3 illustrates a typical Hertzian stress calculation resulting at the point of contact of the four contacting radii indicated at $R_1$, $R_2$, $R_3$, and $R_4$. $R_1$ shows the transverse arcuate surface on the rollers for point contact. In this test, for example, the radii were as follows: $R_1 = .250''$; $R_2 = \infty$; $R_3 = 3.75$; and $R_4 = .375$. Using this particular arrangement, operation in the range of 400,000 to 850,000 p.s.i. maximum Hertzian stress can be accomplished by loads of from 100 to 1200 lbs. Increased load sensitivity may be built into the tester by use, say, of a 2:1 magnification factor for load cell force to roller impingement force. Thus maximum Hertzian stress level can easily be shifted and controlled for increments of change as small as 25,000 p.s.i. maximum Hertz. In addition, by adjusting current in the A.C. motor 34, by means of a variac or the like, the speed of operation can be controlled in a range, say, of 0 to 35,000 stress cycles per minute. Hence, a test specimen can be subjected to 50 million stress cycles in a 24-hour period. By means of the formula $$S_{max.} = \frac{\left[\frac{1}{\pi}\left(\frac{1}{3}\frac{E}{1-\sigma^2}\right)\frac{2}{3}\right]\left[\frac{1}{R_1}+\frac{1}{R_2}+\frac{1}{R_3}+\frac{1}{R_4}\right]\frac{2}{3}P_0\frac{1}{3}}{\mu\nu}$$

where $E$ = Modulus of elasticity
$\sigma$ = Poisson's ratio $$P_0 = \frac{\text{Applied load}}{2}$$

$\mu\nu$ = Hertz factor maximum Hertzian stress is then calculated. The curve in FIG. 3 represents a typical load cell load versus maximum Hertzian stress for the RC rig.

Turning now to FIGS. 4 and 5, depicted therein is a modification of the device shown in FIGS. 1 and 2 for performing studies under conditions of high temperature, say, from 400° F. to 1500° F. The basic difference between the room temperature RC rig and the hot RC rig is the incorporation of an induction coil 40 for heating the specimen and surrounding air. The induction coil is in the form of copper tubing placed around the specimen and on each side of the hemispherical rollers 16—16. The temperature of the induction coil is controlled by power settings on an induction unit (not shown) and the temperature gradient along the length of the specimen is controlled by precise induction coil geometry. The temperature gradient may then be measured by a plurality of suitably-designed thermocouples 48, shown in FIG. 5, adapted to be inserted in the specimen. A specially-designed slip-ring assembly, indicated generally at 44, is supported by a hollow connecting shaft 46 attached to the free end of the rotating specimen 20. The hollow shaft is utilized to support the slip-ring assembly and to protect the thermocouples 48, of which three are shown in the drawing. The thermocouples are attached to three slip-rings 50 which, in turn, contact a series of power takeoffs, indicated at 52. The takeoffs may then be connected to a potentiometer or recorder (not shown) for monitoring the temperature. A support bearing 54 for the hollow connection shaft was found to be desirable to prevent whipping of the extended rotor shaft.

The hot RC rig has been successfully operated at speeds of 7,000 r.p.m. and above while maintaining precise temperature monitoring in both dry and lubricated bearing fatigue tests. At 700° F. it was found that external cooling was not necessary. However, above that temperature, say, when the temperature reaches 1000° F., it may be necessary to provide some form of cooling, such as an air stream, or the like. In addition, greater accuracy may be obtained by pre-heating the test specimen when testing with the hot rig to counteract the effect of expansion of the bearing material due to proximity to the induction coil.

FIGS. 6 and 7 illustrate clearly that one of the major causes of fatigue failure in bearings, i.e., spalling or chipping of the metal away from the bearing surfaces, can be accurately duplicated in the laboratory by my invention. In the illustrations, which were drawn from photographs of a specimen and an actual ball-bearing 56 which had failed, it will be seen that the appearances of the failures are almost identical. Subsequent minute metallographic examination confirmed even more so this striking similarity. Furthermore, in one series of rolling contact fatigue tests, for example, where loads when applied at four stress levels (i.e., 777,000, 747,000, 715,000, and 640,000 p.s.i. maximum Hertz) it was learned that by using Weibull distribution plots a very accurate predicted bearing fatigue map can be prepared from RC rig data. The correlation between the laboratory developed data, as shown in the predicted endurance life map, and actual bearing fatigue data was found to be exceptional. It was also found that the RC rig tended to produce optimum fatigue life data while the previously known, more complex bearing material test procedures produced data which invariably were influenced by outside variables, such as alignment.

RC rig tests have also been made to evaluate the effect and usefulness of various lubricants at room temperatures and the extremely hot temperatures typical of high speed applications. Again, it was shown that with the instant apparatus much more accurate determinations of fatigue life were capable of being obtained, as compared with rigs which are subject, e.g., to complex aerodynamic variables, as is the case with at least one of the previously known devices. Aside from its primary function of providing compressive fatigue data, therefore, my improved bearing materials tester can also be used to study the effects of overtemperature, various lubricants, thermocycling, thermoshock, contact configuration, stresses, etc., in relation to bearing material life.

In addition, as shown in FIG. 8, my improved apparatus can be easily adapted to provide sliding or wear bench tests. In such cases the rollers are adapted to grip a cylinder 58 constructed of bearing race material by cutting semi-circular segments 60—60 from the periphery of each roller. A specimen of bearing material 62 can then be inserted in the "race" and tested for wear characteristics. Furthermore, as shown in FIG. 9, a bearing material specimen can be notched, as at 64, to accommodate the rollers 16—16 and contact geometry tested. By varying the size of the notch various stress configuration can be developed and correlated. Also the rolling elements, instead of merely rotating, may be rotatably oscillated, or a sliding action (for journal bushing and bearing testing) may be provided.

In order to facilitate an understanding of my invention, therefore, I have made reference to certain embodiments and modifications, but it will be understood that no limitation of the scope of the invention was thereby intended and that such further modifications of structure or function are contemplated as would be effected by those skilled in the art without the exercise of invention.

What I desire to claim as novel and secure by Letters Patent is:

1. An improved test apparatus for obtaining bearing material design data comprising: a pair of oppositely-disposed rollers having arcuate specimen-contacting surfaces on the peripheries thereof; pivoted means supporting said rollers; load means operatively connected to said pivoted means to apply force to said rollers to cause said arcuate surfaces to swing into contact with the specimen; and motive means operative to impart rotation to the specimen, said load means and said motive means combining with said oppositely-disposed rollers to develop compressive stresses in said specimen when said arcuate surfaces are in contact therewith.

2. An improved test apparatus for obtaining bearing material design data comprising: a pair of diametrically-opposed rollers having transverse arcuate specimen contacting surfaces on the peripheries thereof; a pair of pivoted yokes having means supporting said rollers for rotation therein; load means connected to said yokes to apply force thereto to cause said rollers to swing and impinge on a material specimen located on a line joining the centers of and between the rollers during a test operation; supporting means to hold the specimen in the test position; and motor means operatively connected to said last mentioned supporting means to impart rotation thereto, said load means and said motor means combining with said impinging rollers to develop compressive stresses in said specimen during the testing operation.

3. An improved test apparatus for obtaining bearing material design data comprising: a pair of diametrically-opposed rollers having transverse arcuate material specimen contacting surfaces thereon; reciprocally-mounted pendulum means supporting said rollers and having axle means therein to allow said rollers to rotate thereon; load-applying means connected between said reciprocally-mounted means; and specimen supporting means locating the specimen in a test position between said arcuate surfaces on a line joining the roller centers, said specimen supporting means being driven to impart rotation to said specimen, said load-applying means and said diametrically-opposed members combining to develop compressive stresses by contact with said material specimen during the testing operation.

References Cited in the file of this patent

UNITED STATES PATENTS

| | | |
|---|---|---|
| 1,944,353 | Lindner | Jan. 23, 1934 |
| 1,945,294 | Pike et al. | Jan. 30, 1934 |
| 2,114,029 | Perry | Apr. 12, 1938 |
| 2,482,381 | Stevens et al. | Sept. 20, 1949 |
| 2,600,453 | Weingart | June 17, 1952 |
| 2,761,310 | Siegel | Sept. 4, 1956 |